(12) United States Patent
Chafle et al.

(10) Patent No.: US 7,584,276 B2
(45) Date of Patent: Sep. 1, 2009

(54) ADAPTIVE ORCHESTRATION OF COMPOSITE SERVICES

(75) Inventors: Girish Bhimrao Chafle, New Delhi (IN); Sunil Chandra, New Delhi (IN); Neeran M Karnik, Pune (IN); Vijay Mann, Haryana (IN); Mangala Gowri Nanda, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 11/236,273

(22) Filed: Sep. 27, 2005

(65) Prior Publication Data
US 2007/0073883 A1 Mar. 29, 2007

(51) Int. Cl.
*G06F 15/16* (2006.01)
*G06F 15/173* (2006.01)
*G06F 15/177* (2006.01)

(52) U.S. Cl. .......................... 709/223; 709/224; 707/1; 714/819; 455/444

(58) Field of Classification Search ......... 709/217–228; 707/1; 714/819; 455/444
See application file for complete search history.

(56) References Cited

U.S. PATENT DOCUMENTS

| | | | |
|---|---|---|---|
| 6,633,757 B1 * | 10/2003 | Hermann et al. ......... | 455/414.1 |
| 7,406,313 B2 * | 7/2008 | Lynch et al. ............... | 455/444 |
| 7,454,496 B2 * | 11/2008 | Kundu ....................... | 709/224 |
| 2002/0061741 A1 | 5/2002 | Leung et al. | |
| 2003/0097464 A1 | 5/2003 | Martinez et al. | |
| 2003/0191677 A1 | 10/2003 | Akkiraju et al. | |
| 2003/0200283 A1 | 10/2003 | Suryanarayana et al. | |
| 2004/0030740 A1 | 2/2004 | Stelting | |
| 2004/0103308 A1 | 5/2004 | Paller | |
| 2004/0148299 A1 | 7/2004 | Teegan et al. | |
| 2004/0176976 A1 | 9/2004 | Boughannam | |
| 2004/0176988 A1 | 9/2004 | Boughannam | |
| 2004/0205187 A1 | 10/2004 | Sayal et al. | |
| 2004/0210623 A1 | 10/2004 | Hydrie et al. | |
| 2004/0220910 A1 | 11/2004 | Zang et al. | |
| 2004/0225952 A1 * | 11/2004 | Brown et al. ............... | 714/819 |
| 2006/0106748 A1 * | 5/2006 | Chafle et al. ............... | 707/1 |

OTHER PUBLICATIONS

"On Exploring Performance Optimizations in Web Service Composition", Jingwen Jin and Klara Nahrstedt, pp. 1-20, Oct. 2004.*

* cited by examiner

*Primary Examiner*—Haresh N Patel
(74) *Attorney, Agent, or Firm*—Gibb I.P. Law Firm, LLC

(57) ABSTRACT

Decentralized orchestration of composite services results in a number of flow topologies which differ in their messaging patterns and the distribution of flow code amongst different partitions of a topology. Different performance metrics result for different topologies, and this is governed by the availability of resources, such as CPU cycles, memory, network bandwidth, and so on. A performance model is used to evaluate the performance of different topologies based on availability of resources, and dynamically direct client requests between different topologies according to prevailing conditions.

19 Claims, 8 Drawing Sheets

TOPOLOGY 2

☐ composite service partition

◯ web service

⟶ communication over LAN (local area network)

---▶ communication over WAN (wide area network)

TOPOLOGY 3 composite service partition web service

⟶ communication over LAN (local area network)

---▶ communication over WAN (wide area network)

TOPOLOGY 4 composite service partition
web service
communication over LAN (local area network)
communication over WAN (wide area network)

ADAPTIVE ORCHESTRATION OF COMPOSITE SERVICES

FIELD OF THE INVENTION

The present invention relates to orchestrating composite web services, and relates more particularly to adaptive orchestration in response to variation in availability of resources.

BACKGROUND

Composite web services make use of the functionality provided by existing web services (which act as component services) and invoke them to achieve a new and/or complex functionality. Various existing systems use partitioning of applications to improve overall system performance and adaptability. The term "partitions" refers to the pieces of composite service specification (or the workflow specification) that get generated after the input composite specification is partitioned by a decentralizing algorithm. Typically these systems aim at minimizing the data on the network or the number of hops.

These two approaches are exemplified by Zhuang and Pande, and Baresi et al., which have the following respective references: X. Zhuang and S. Pande, "Compiler scheduling of mobile agents for minimizing overheads", In *Proceedings of the 23rd International Conference on Distributed Computing Systems (ICDCS '03)*, May 2003; and, L. Baresi, A. Maurino, and S. Modafferi, "Partitioning of workflows on mobile information systems", In *IFIP TC8 Working Conference on Mobile Information Systems (MOBIS '04)*, 2004.

Zhuang and Pande show how to schedule mobile agents to optimize either the data on the network or to optimize the number of data transfers. Baresi et al. present an alternate approach for partitioning the execution of BPEL processes on to a network of mobile devices.

For a given set of available resources at runtime, however, the "best" solution is not necessarily the topology with the least number of hops, or the topology that minimizes the data on the network. An alternative approach is to dynamically adapt to runtime changes in available resources. Dynamic reconfiguration of a system is used to improve overall system performance in two existing application partitioning approaches, namely "method partitioning" (Zhou et al.), and "coign" (Hunt and Scott). Zhou et al. and Hunt and Scott have the following references: D. Zhou, S. Pande, and K. Schwan, "Method partitioning—runtime customization of pervasive programs without design-time application knowledge", In *Proceedings of the 23rd International Conference on Distributed Computing Systems (ICDCS '03)*, May 2003; and, G. Hunt and M. Scott, "The coign automatic distributed partitioning system", In *Proceedings of the 3rd Symposium on Operating System Design and Implementation (OSDI '99)*, February 1999. The method partitioning and coign models both choose the optimal partitioning plan at run-time, based on monitored data.

Method partitioning uses static analysis to partition methods responsible for message handling. Cost models are used for evaluating the costs/benefits of different partitioning plans. These models are used with data collected from runtime profiling to monitor the actual costs of candidate plans and dynamically select "best" plan from the candidate plans.

Coign is an automatic distributed partitioning system for COM (Component Object Model) components. For an application consisting of distributable COM components, a graph model is constructed of the application's inter-component communication through scenario-based profiling. A graph-cutting algorithm is then used to partition the application across a network, and minimize execution delay due to network communication.

However the models presented in both these papers restrict themselves to partitioning of an application over two nodes. If any resource (such as CPU, memory, or IO) on one of the two nodes or the bandwidth between the two nodes becomes a bottleneck, then not much adaptation can be done. A composite web service will typically consist of more than one component web service (and hence, more than two nodes in the system), and these additional nodes can be used to route messages to one another as long as data and control flow dependencies are respected. This allows makes it possible to adaptively use different links (i.e. topologies) in response to variation in availability of resources like network bandwidth.

There are also various approaches developed in the field of adaptive systems and adaptation frameworks, as described immediately below. These approaches make use of runtime adaptations; however they don't concern themselves with orchestrating applications or services.

Quality Objects (QuO) is a framework for creating CORBA applications that adapt to different Quality of Services (QoS) offered by the underlying network. QuO is described in R. Vanegas, J. Zinky, J. Loyall, D. Karr, R. Schantz, and D. Bakken. "Quo's runtime support for quality of service in distributed objects", In *Middleware '98*, 1998. Also, FARA provides a framework of abstractions and mechanisms for building integrated adaptation and resource allocation services in complex real-time systems. FARA is described in D. Rosu, K. Schwan, and S. Yalamanchili, Fara—a framework for adaptive resource allocation in complex real-time systems, In *The 4th IEEE Real-Time Technology and Applications Symposium (RTAS)*, 1998.

MIMO uses multiple-input, multiple-output control theory to control the overall CPU and memory utilization of a system (such as a web server) through the MaxClients and KeepAlive parameters. MIMO is described [8] Y. Diao, N. Gandhi, J. L. Hellerstein, S. Parekh, and D. M. Tilbury. "Using mimo feedback control to enforce policies for interrelated metrics with application to the apache web server", In *Proceedings of the Network Operations and Management Symposium*, February 2002.

CANS provides an application-level infrastructure for injecting application-specific components into the network. Dynamic composition of these individual components and distributed adaptation of these components in provided response to system conditions. CANS is described in X. Fu, W. Shi, A. Akkerman, and V. Karamcheti, "Cans: Composable, adaptive network services infrastructure", In *3rd USENIX Symposium on Internet Technologies and Systems*, 2001.

Existing approaches to orchestrating applications or services, such as those examples described above, are not universally satisfactory, and improved approaches are desirable. A need thus exists for such improved approaches, especially approaches suited to orchestrating composite services delivered via a network.

SUMMARY

Composite services are typically specified using workflow languages and orchestrated in a centralized fashion. If these services are orchestrated on distributed infrastructure in a decentralized fashion, performance benefits are yielded by exploiting concurrency and reducing data on the network.

Decentralization involves partitioning of the composite service specification, and typically yields several flow topologies.

These flow topologies differ in their communication patterns between partitions, and in the distribution of the flow code amongst partitions, thus resulting in different performance characteristics. Further, the performance of these topologies is affected in different ways by the availability of resources, such as CPU (central processing unit) cycles, memory and bandwidth, which vary at runtime.

The present invention estimates performance metrics for respective topologies, based upon the one or more monitored data values, and routing each request for the composite service to one of the topologies based upon the estimated performance metrics for the respective topologies.

A topology is selected at run-time based on the availability of the resources, and the incoming requests are sent to the selected topology. Performance metrics are estimated by calculating the performance metrics based upon a performance model. The performance model takes as input: (i) the average message sizes flowing between different partitions, (ii) the rate of incoming and outgoing messages at each partition, and (iii) the available bandwidth on each communications link.

The monitored parameters associated with a communications link are selected from the group comprising: available bandwidth, average message size, average message rate. The monitored parameters associated with a node are selected from the group comprising: available CPU cycles, and available memory.

DETAILED DESCRIPTION

An adaptive orchestration of decentralized composite service is described herein in the context of a composite service accessing component services over a network. The example described herein concerns a composite web service, which is created by aggregating the functionality provided by existing web services, which act as its components. Composite web services can be specified using suitable XML-based languages, such as BPEL4WS, WSIPL and WSCI.

For reference, BPEL4WS is described in "business Process Execution Language for Web Service", version 1.1, available at the time of filing from http://wwww.ibm.com/developerworks/library/wsbpel, and also in R. Khalaf, N. Mukhi, and S. Weerawarana, "Service-Oriented Composition in BPEL4WS", In *Proceedings of the Twelfth International World Wide Web Conference (WWW)*, 2003. WSIPL is described in D. W. Cheung, E. Lo, C. Y. Ng, and T. Lee. Web, "Services Oriented Data Processing and Integration", In *Proceedings of the Twelfth International World Wide Web Conference (WWW)*, Budapest, Hungary, May 2003. WSCI is described in Web Service Choreography Interface (WSCI) 1.0, which is available from http://www.w3.org/TR/wsci. The content of these references is incorporated herein by reference in their entirety.

Figure 1:
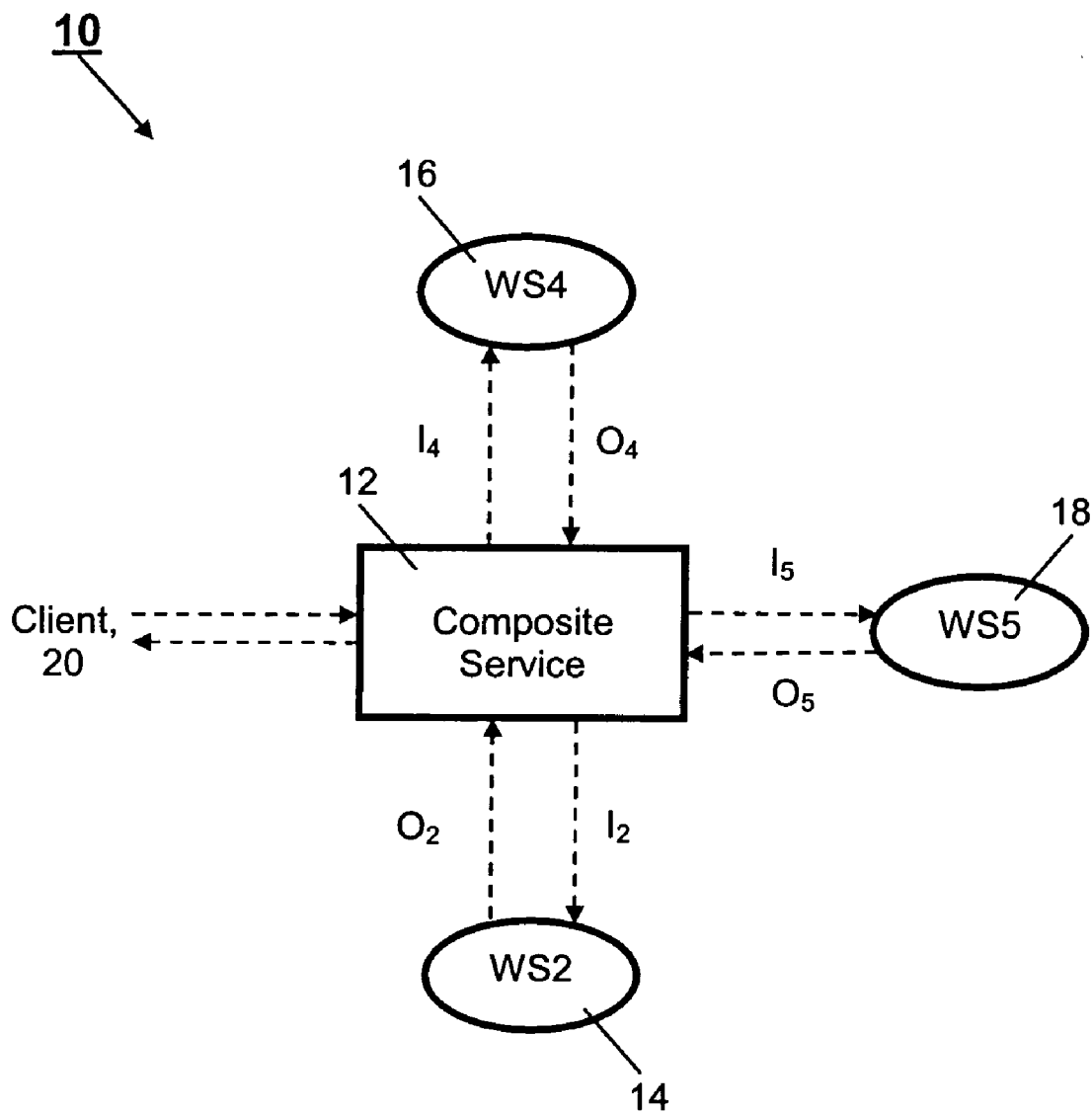
FIG. 1 is a schematic representation of a centralized orchestration of a composite service.
Figure 2A:
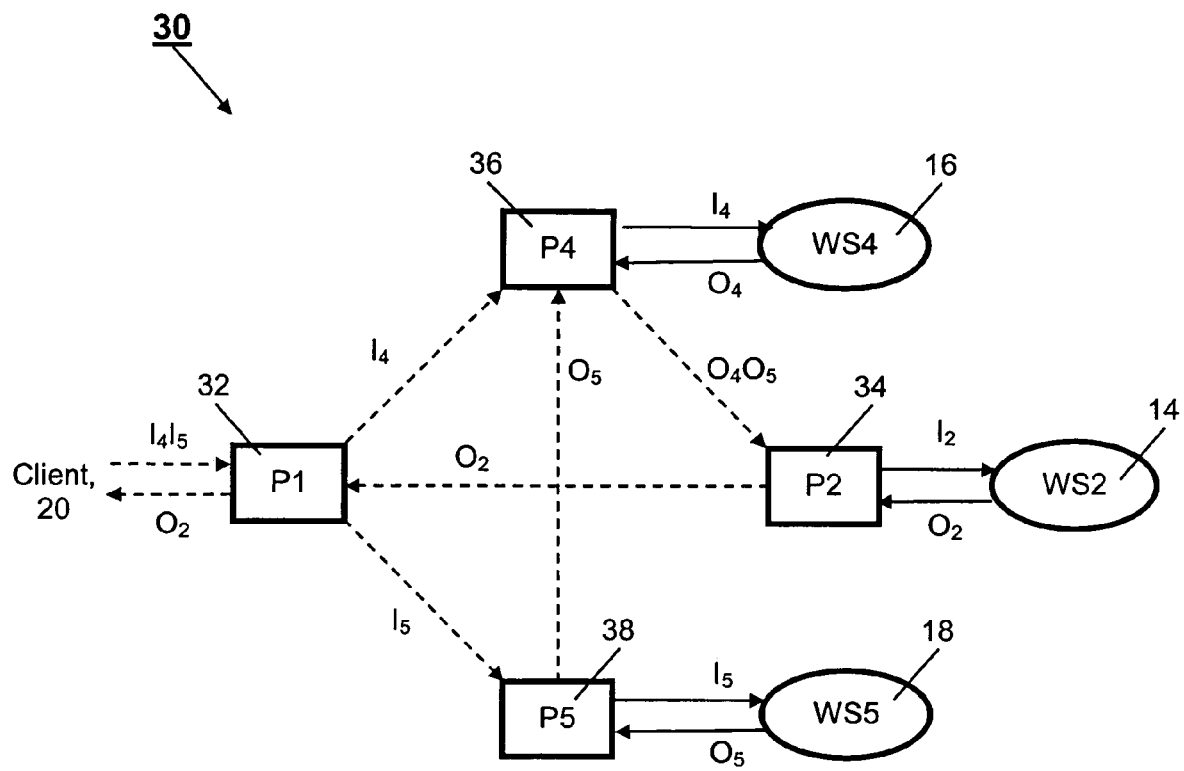
FIGS. 2A to 2D are schematic representations of topologies generated by decentralization of the composite service represented in FIG. 1.
Figure 2B:
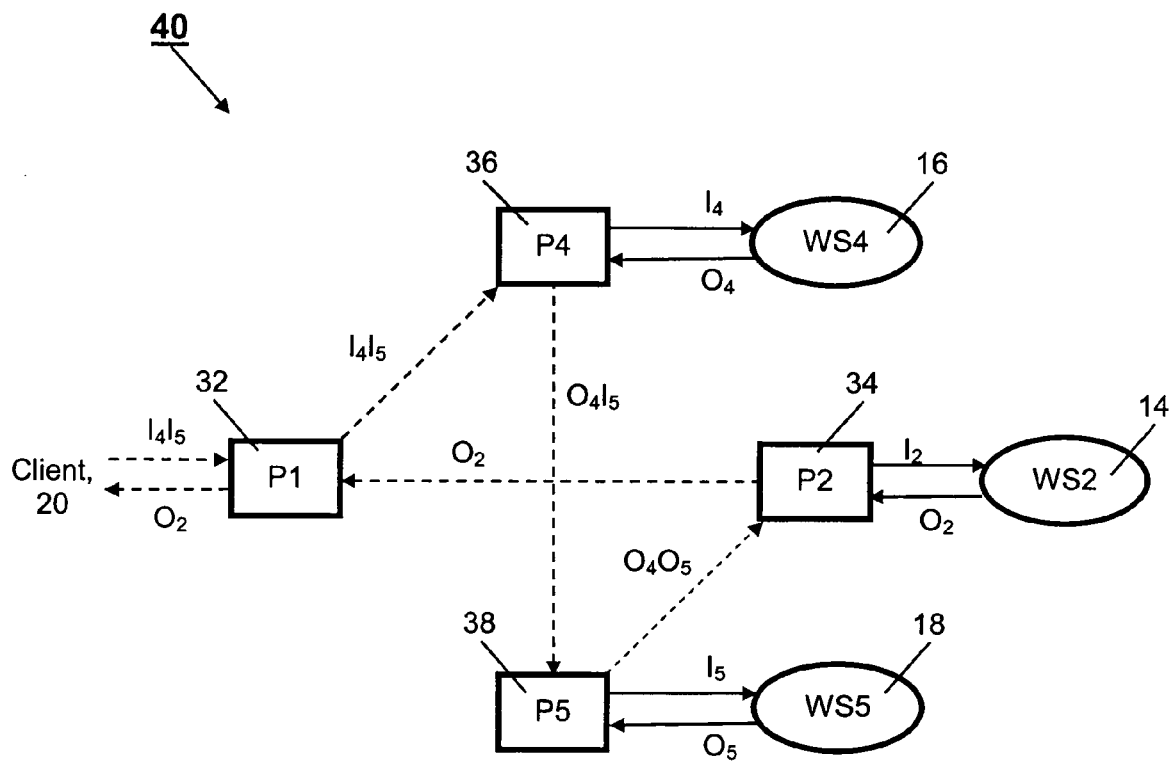
Figure 2C:
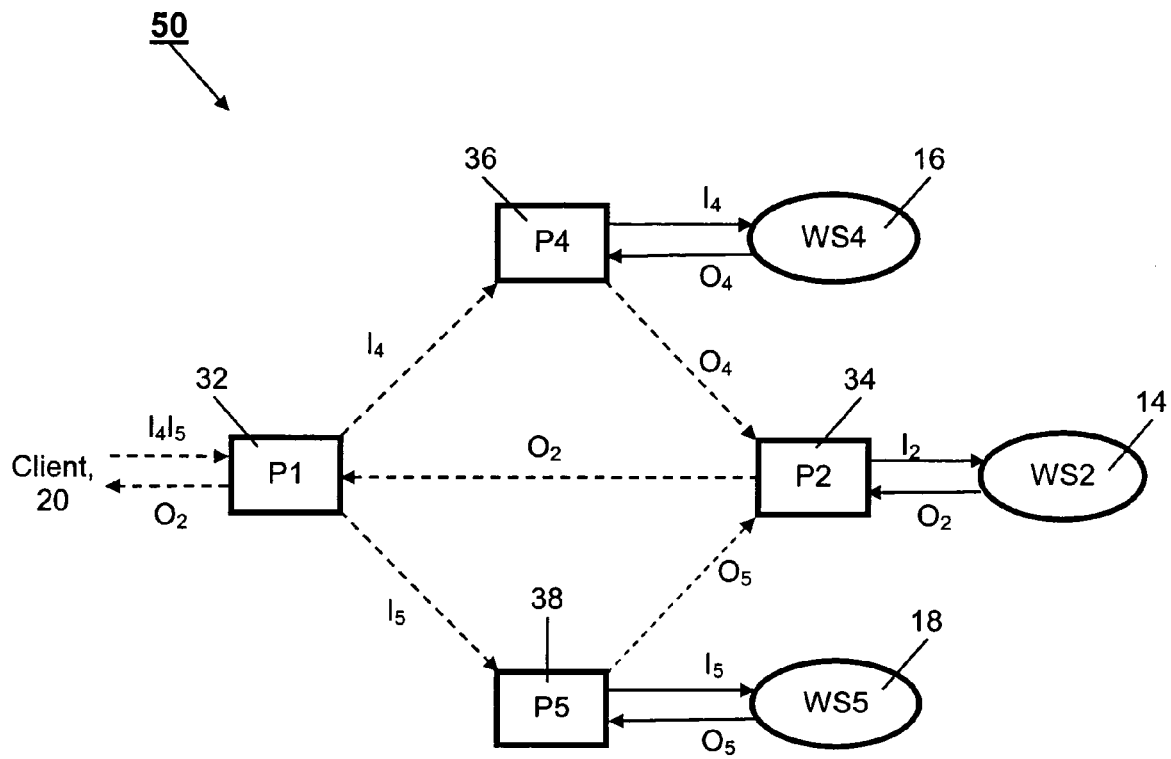
Figure 2C:
Figure 2C:
Figure 2D:
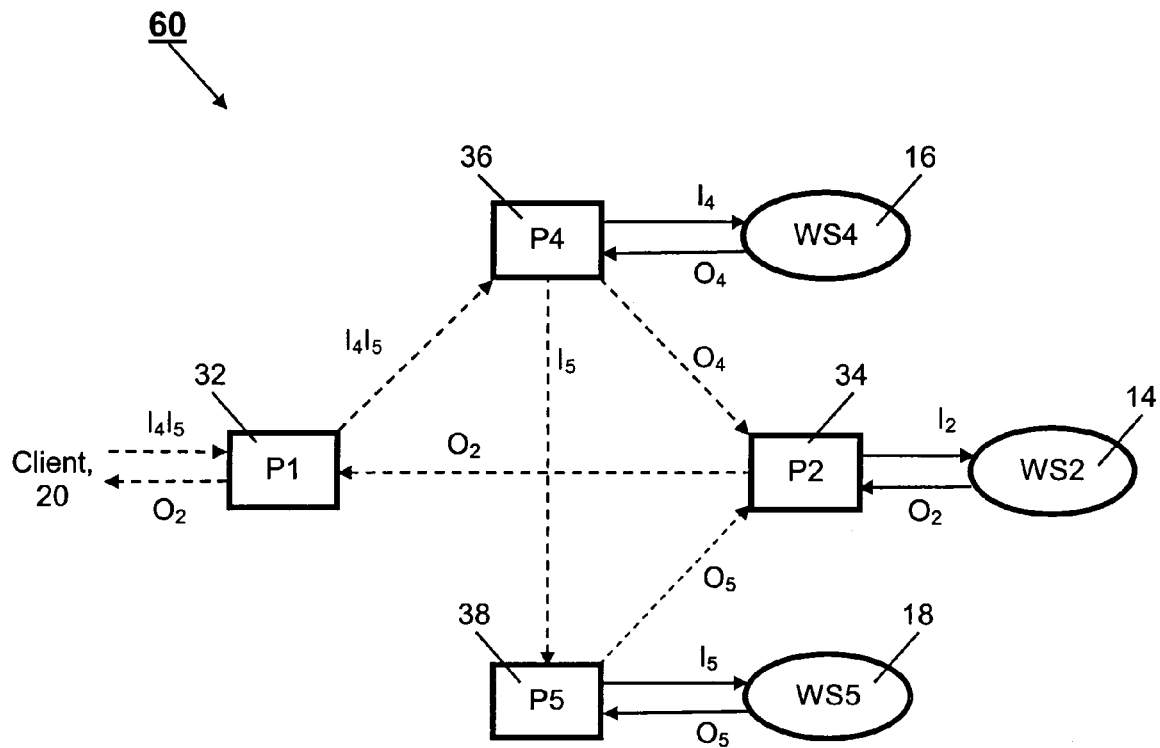

Typically, a composite service is orchestrated by a coordinator node. The coordinator node receives client requests, invokes the component web services, and transforms the data in accordance with the flow specification. FIG. 1 schematically represents a centralized orchestration 10 of an example composite service, in which a composite service partition transmits input ($I_2$, $I_4$, $I_5$) to and receives output ($O_2$, $O_4$, $O_5$) from component services WS2 14, WS4 16, and WS5 18, and sends output to the client 20.

A flow decentralization algorithm, details of which are used in the techniques used herein, is described in M. G. Nanda, S. Chandra, and V. Sarkar, Decentralizing Execution of Composite Web Services, In *Proceedings of OOPSLA '04 Conference on Object Oriented Programming Systems, Languages, and Applications*, 2004. Experiences using this algorithm are reported in G. Chafle, S. Chandra, V. Mann, and M. G. Nanda, "Decentralized orchestration of composite web services", In *Proceedings of the 13th International World Wide Web Conference (WWW)*, New York, USA, May 2004. Related issues of concurrency and synchronization are described in M. G. Nanda and N. Karnik, "Synchronization Analysis for Decentralizing Composite Web Services", In *Proceedings of the ACM Symposium on Applied Computing (SAC)*, 2003. The content of each of these publications are incorporated herein by reference in their entirety.

In one embodiment, a composite service specification is analyzed for data and control dependencies by the flow decentralization algorithm described immediately above. Many semantically-equivalent decentralized topologies are created, where each topology consists of a set of code partitions, which execute independently and which interact with each other directly by transferring data items using asynchronous messaging without any centralized control. One partition is created per component service in the flow specification.

Each partition is deployed in network proximity to the component service that the partition invokes. Each partition acts like a proxy that processes and manages all incoming and outgoing data for the component service. The decentralization algorithm attempts to reduce the data on the network by designing the inter-partition messaging such that data items are sent directly from their point of generation to their point of consumption. Any filtering or transformation of the data is also done by the local partition, before forwarding the data. There are typically many different decentralized flow topologies equivalent to a given composite service.

FIGS. 2A to 2D schematically represent four decentralized topologies, all equivalent to the composite service represented in FIG. 1. These topologies differ in their messaging patterns (the communicating partitions, and message contents), and in the distribution of the flow code between partitions. This results in different performance characteristics for these different topologies.

In these decentralized topologies 30, 40, 50, 60 a composite service partition 32, 34, 36, 38 receives input from another partition or the client 20, invokes a respective component service 14, 16, 18 and sends output to another partition. The composite service partitions 32, 34, 36, 38 provide "glue code" to aggregate the component services, whereas the business logic is embedded in these component services 14, 16, 18. Executing this glue code is usually not computationally intensive. The composite service partitions 32, 34, 36, 38 do, however, perform a significant amount of network I/O, by supplying the component services with appropriate input data, and receiving their output data.

The performance of each topology 30, 40, 50, 60 is governed by the runtime availability of resources such as CPU cycles, memory, bandwidth, and so on. A lack of resources may become a bottleneck at high loads, and limit the performance of a topology. Each topology is affected differently by such resource constraints. Typically, no single topology is statically optimal under varying runtime conditions. The availability of resources is monitored, and the effect on the performance of each topology is estimated, and the optimal topology can be selected at runtime.

Since resource availability can vary significantly over time, the topologies are regularly reassessed, and the composite service is reconfigured by switching to whichever topology is best at that time. Such dynamic selection of topology can thus improve the overall performance of the system.

Clients typically invoke a composite service remotely, across a wide-area network (WAN). Similarly, the component services are potentially distributed across a WAN as well. Thus, the communication between partitions (colocated with component services) also incurs WAN latencies. Wide-area network characteristics change over time due to various reasons (link failures, queuing delays at routers, and congestion due to competing traffic, and so on). Similarly, the CPU and memory availability at the various processing nodes can fluctuate due to varying input load or external factors such as other applications sharing the node resources.

There are various ways of choosing the topology to which the system switches. The method for choosing the topology desirably takes into account a measure of system parameters, such as available bandwidth, average message sizes and message rates. One can desirably predict the effect of such system parameters on different topologies. The method can also take into account the build-up of message queues on different communication paths, to switch to a topology which allows these queues to drain out relatively quickly.

An adaptive system is described that dynamically switches between different topologies at runtime taking into account, in this example, the available network bandwidth. A performance model is proposed based on bandwidth that computes a predicted throughput of the system using the message rates at different partitions, a build-up of message queues along different paths, and observed message sizes and bandwidth on different communication links.

Performance Model

A preferred embodiment of a performance model is now described for estimating the throughput of a topology, using various runtime metrics as inputs. Each incoming request to a composite service is routed along one topology, and follows that topology throughout its lifecycle. Typically, all requests during an epoch (of configurable duration) follow the same topology, though load balancing incoming requests between topologies is also envisaged. At the end of the epoch, the network performance model is applied to estimate the throughput of each alternative topology, and to select a new topology—if appropriate—for the next epoch.

The performance model, in the form described herein, is based on basic principles of queuing theory, and the characteristics of decentralized composite services, and is based upon the following monitored parameters: (i) average message sizes flowing between different partitions, (ii) the rate of incoming and outgoing messages at each partition, and (iii) the available bandwidth on each link taking into account the runtime traffic due to other applications using the link.

Figure 3:
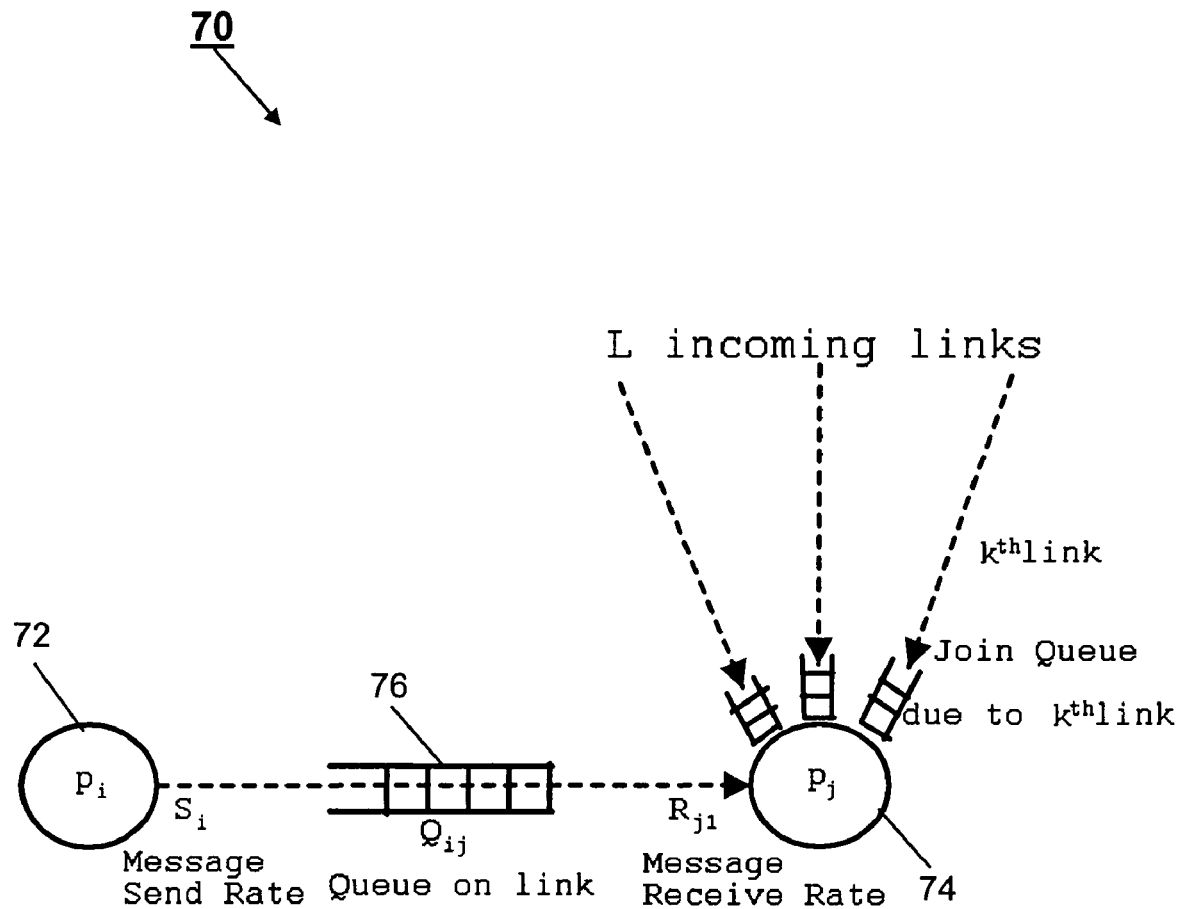
FIG. 3 is a schematic representation of a typical sender partition and join partition.

FIG. 3 schematically represents a system 70 of sender partitions and join partitions. Let, $p_i p_j$ be a directed link from partition $p_i$ 72 to partition $p_j$ 74 and $BW_{ij}$ be the bandwidth of this link. Let $S_i$ be the outgoing message rate in messages/second at partition $p_i$. Let $R_i$ be the incoming message rate in messages/second for partition $p_i$. On a link $p_i p_j$, if the outgoing messages rate $S_i$ at partition $p_i$ 72 is greater than the link bandwidth, then a queue $Q_{ij}$ 76 builds up.

For a link $p_i p_j$, there are three possibilities: (i) $S_i > BW_{ij}$ resulting in increase of the queue size on the link, (ii) $S_i = BW_{ij}$ resulting in no change in the queue on the link, (iii) $S_i < BW_{ij}$ resulting in depletion of the queue on the link, if already built up.

For the nth window of duration t seconds the queue on the link can be calculated in accordance with Equation [1] below.

$$Q_{ij}(n) = S_i(n)*t - R_j(n)*t + Q_{ij}(n-1) \qquad [1]$$

The partitions are classified as: (a) simple partitions that have exactly one incoming link, or (b) join partitions that have more than one incoming link. The throughput estimation for each type of partition is described below.

For simple partitions, given that $R_j(n)$ is the rate at which requests are received in the window n, the outgoing rate of requests at the partition j is given by Equation [2] below, in which $\Delta n$ is the processing time at the partition.

$$S_j(n+\Delta n) = Rj(n) \qquad [2]$$

For join partitions, for each client request, the partition receives one message on each incoming link, and then correlates these messages. For a partition, $p_k$ with two incoming links $p_i p_k$ and $p_j p_k$, if a message arrives on $p_i p_k$, the message is queued at the partition until the corresponding message on $p_j p_k$ also arrives. For a partition with L incoming links, there are L queues at the partition. $Q_{ki}^{join}(n)$ is the queue length on partition $p_k$ due to the i-th incoming link, as is calculated according to Equation [3] below. Let $R_{ki}(n)$ be the received message rate on link $p_i p_k$ in the window n, then $$S_k(n + \Delta n) = \min_{i=1}^{L}(R_{ki}(n) + Q_{ki}^{join}(n-1)/t) \qquad [3]$$

$$Q_{ki}^{join}(n) = Q_{ki}^{join}(n-1) + R_{ki}(n)*t - S_k(n)*t$$

For simplicity, an assumption is made that outgoing messages from a partition follow the order of the (causally-related) incoming messages.

The fact that incoming requests corresponding to different topologies can be active in the system at any point of time (due to queuing of those requests at an earlier time) is taken into account. Let $M_{ij\tau}$ be the observed average message size on the link $p_i p_j$ of topology $\tau$, and $S_{i\tau}$ be the outgoing message rate at node $p_i$ for this topology, then average message size on the link $p_i p_j$ can be calculated according to Equation [3] below.

$$M_{ij}(n) = \frac{\sum_{\tau}(S_{i\tau}(n) * M_{ij\tau}(n) * t_{\tau})}{\sum_{\tau}(S_{i\tau}(n) * t_{\tau})} \qquad [3]$$

The estimated total data $D_{ij}$ on this link can be calculated according to Equation [4] below.

$$D_{ij}(n+1) = \sum_{\tau}(M_{ij\tau}(n) * S_{i\tau}(n+1) * t) + Q_{ij}(n) * M_{ij}(n) \quad [4]$$

The incoming message rate $R_j$ on partition $p_j$, in the next interval can be estimated using the formula of Equation [5] below.

$$R_j(n+1) = \frac{\min(BW_{ij}(n+1), D_{ij}(n+1))}{M_{ij}(n)} \quad [5]$$

The incoming message rate for the client facing node is equal to the incoming request rate. This formula can be applied on successive nodes and links of a topology and the outgoing message rate of the last node gives the overall system throughput.

The throughput of all competing topologies is calculated at the start of each epoch, and the topology with highest throughput for that epoch is selected. Note that the average message size on link $p_ip_j$ is different in different topologies. Knowing the average message size across all links in one topology, the average message size across all the links in other topologies can be estimated, since the overall set of message parts (data items) remains the same in all topologies. The data items are merely packed into different messages and routed over different links in different topologies.

System Architecture and Implementation

Figure 4:
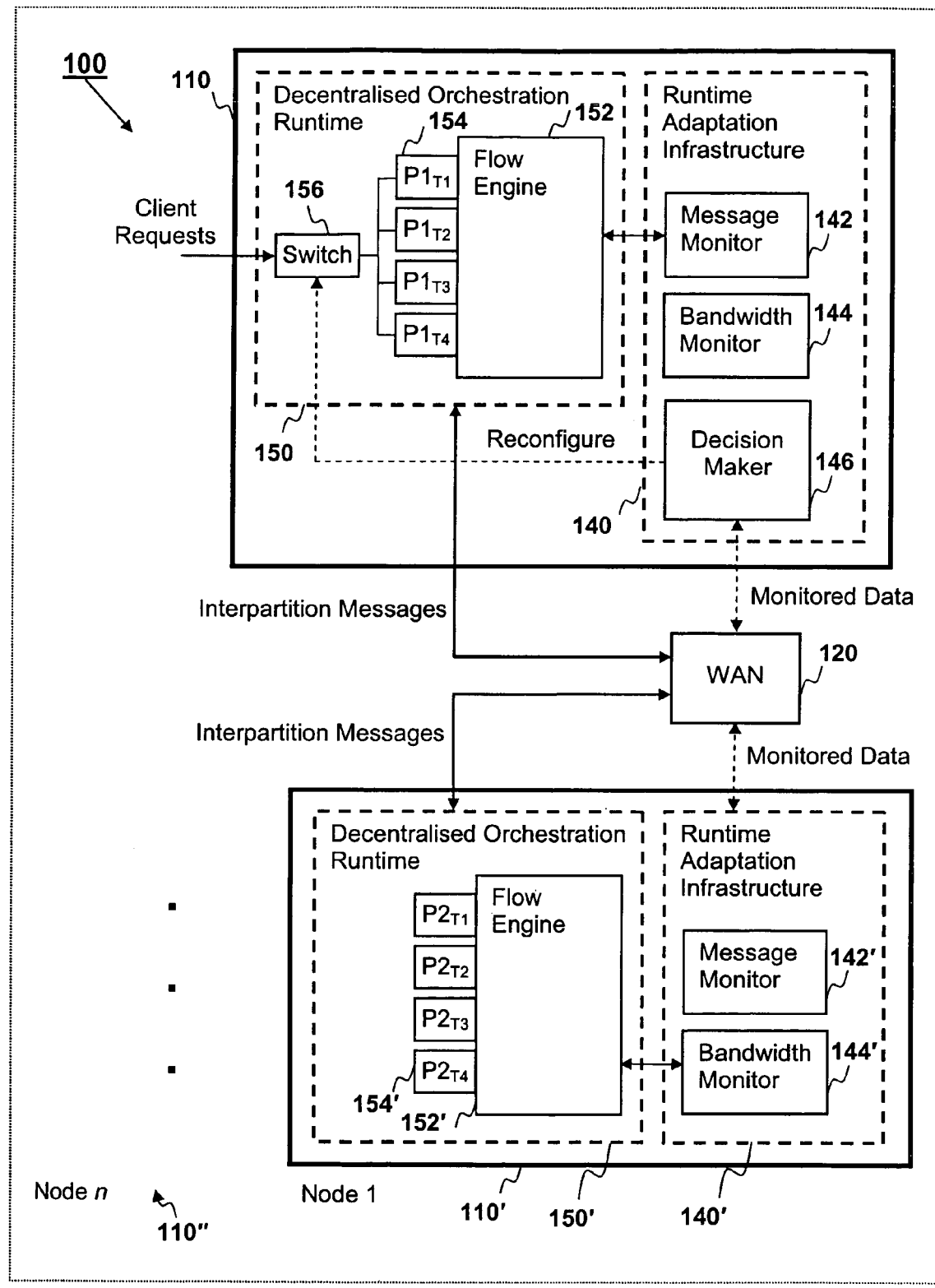
FIG. 4 is a schematic representation of an overall system architecture.

FIG. 4 schematically represents an architecture 100 for adaptive orchestration of composite services. The architecture 100 includes Nodes (primary Node 110, and Node 1 110' ... Node n 110") connected via a WAN 120. For each Node there are different components, which can be categorized as the Runtime Adaptation Infrastructure 140 and the Decentralized Orchestration Runtime 150, as indicated in FIG. 4. The Nodes each have essentially the same components (indicated by corresponding reference numerals), though the primary Node 110 also has a Decision Maker 146 and a Switch 156 component.

The Runtime Adaptation Infrastructure 140 comprises components that regularly monitor parameters on different links. Such parameters may be, for example, bandwidth, average message size, and message rate. The Message Monitor 142 and the Bandwidth Monitor 144 components are depicted as part of the Runtime Adaptation Infrastructure 140 in FIG. 4. The Message Monitor 142 monitors the average message size and message rate on different links. The Bandwidth Monitor 144 monitors the bandwidth on different links. As a result of this activity, the Message Monitor 142 and the Bandwidth Monitor 144 provide Monitored Data to the Decision Maker 146.

The Decision Maker 146 estimates the throughput of all deployed topologies for the next reconfiguration cycle by using the Monitored Data as input to the performance model described above.

The Switch 156 directs the Decentralized Orchestration Runtime 150 to route incoming Client Requests between different topologies, as directed by the Decision Maker 146 for the next reconfiguration interval. Load balancing or simple switching may be used to route the incoming Client Requests between different topologies.

The Decentralized Orchestration Runtime 150 consists of components required for running the Composite Service Partitions P1 154, P2 154' ... Pn 154" generated by the decentralization algorithm.

The Flow Engine 152 hosts the composite service partitions (which are complete composite service/workflow specifications in themselves) and executes them. In case of centralized execution, where composite service partitions are not executed in the domain of component web services, the Flow Engine 152 is not required at the site of component web service.

Particular components of the system architecture 100 of FIG. 4 are described in further detail immediately below.

Decentralized Orchestration Runtime

The Decentralized Orchestration Runtime 150 consists of multiple Flow Engines 152 executing at distinct Nodes 110. The Flow Engine 152 executes the composite service partition. The Flow Engine 152 in one example is WBISF (Websphere Business Integration Server Foundation from IBM Corporation, and in another example is BPWS4J (Business Process Execution Language for Web Services Java Run Time) engine, executing a flow specification written in BPEL4WS, which interacts with the corresponding web services. The BPWS4J engine can be obtained from http://www.alphaworks.ibm.com/tech/bpws4j, the contents of which are incorporated herein by reference in its entirety.

The communication link between the Composite Service Partition 154 and its corresponding web service (WS in FIGS. 2A-2D) is assumed to be a high speed link as the partitions ($P_n$ in FIGS. 2A-2D) (and the flow engines which execute these partitions) are geographically co-located (e.g. on the same LAN) with their corresponding web services (WS). The partitions ($P_n$) of all the candidate decentralized topologies are predeployed on all the required Flow Engines 152.

Runtime Adaptation Infrastructure

Decision Maker

The Decision Maker 146 fetches the observed parameters from the different monitoring agents (142, 144). The Decision Maker 146 operates both in a "pull" and a "push" mode. In the pull mode, the Decision Maker 146 periodically (equal to the reconfiguration cycle time) pulls information from the monitoring agents (142, 144) over the WAN 120. The reconfiguration cycle time is a configurable parameter. Setting reconfiguration cycle time to a lower value means more frequent recalculation of the "optional" topology by the Decision Maker 146. Setting the reconfiguration cycle time to a higher value makes the system less responsive to variations in system conditions. This limitation can be ameliorated by running the monitoring agents (142, 144) and the Decision Maker 146 in push mode also, in which the monitoring agents (142, 144) push data if the monitored parameters cross some predetermined thresholds.

The Decision Maker 146 uses the Monitored Data to estimate the system throughput for all topologies for the next reconfiguration cycle using the performance model described above. Then, the Decision Maker 146 sends a signal to the Switch 156 indicating the topology to be use for the next reconfiguration cycle.

Switch

The Switch 156 receives a signal from the Decision Maker 146 and configures the Decentralization Orchestration Runtime 150 to forward incoming Client Requests to the chosen topology. Existing Client Requests are permitted to complete. A flag is set in the case of simple switching between topologies, and this flag is checked for all Client Requests. Thus, the overhead of switching is negligible.

Message Monitors

Message Monitors 142 are used to monitor the message size and rate at a partition. In one of the embodiments, the Message Monitor 142 subscribes to the same JMS topic used by a partition for listening to messages and thus receives all the messages received by that partition.

Input messages for different partitions corresponding to different topologies may be received at a node at any time. There is a different Message Monitor 142 for each such partition (that belongs to a different topology) at each node. This ensures that the Message Monitor 142 receives only those messages that are meant for that particular partition. On receiving a message, the Message Monitor 142 increments the received message count for the topology to which the partition belongs. The Message Monitor 142 then searches for the parts contained in the message by comparing the message with the appropriate partition WSDL. This helps in estimating the size of individual message parts, which are required for computing the message size for the other topologies.

On receiving a request from the Decision Maker 146, the Message Monitor 142 transmits the incoming message rate and the average size of individual message parts of that topology as Monitored Data to the Decision Maker 146.

Bandwidth Monitors

The Bandwidth Monitor 144 monitors the available bandwidth on different links ($p_i p_j$) between the partitions ($P_n$). This is done using the TCP/UDP bandwidth measurement tool Iperf, which is available at http://dast.nlanr.net/Projects/Iperf/, the contents of which are incorporated herein by reference in its entirety. There is an Iperf instance on each end of a link. On one end, Iperf runs in the client mode, and on the other end of the link Iperf runs in the server mode. Thus, join and fork nodes have more than one Iperf instance. The bandwidth measured by Iperf client is reported at the reconfiguration cycle time to the Decision Maker 146.

The Bandwidth Monitors 144 maintain an internal sampling interval (smaller than the reconfiguration cycle time) at the end of which, the bandwidth is measured. This allows the Bandwidth Monitors 144 to operate in a push mode, where they can push the monitored bandwidth to the Decision Maker 146 if the monitored bandwidth varies significantly (for example, beyond a predetermined threshold of 20%) between any two internal sampling intervals. This ensures that the Decision Maker 146 does a reconfiguration before the end of the stipulated reconfiguration cycle time.

Computer Hardware

Figure 5:
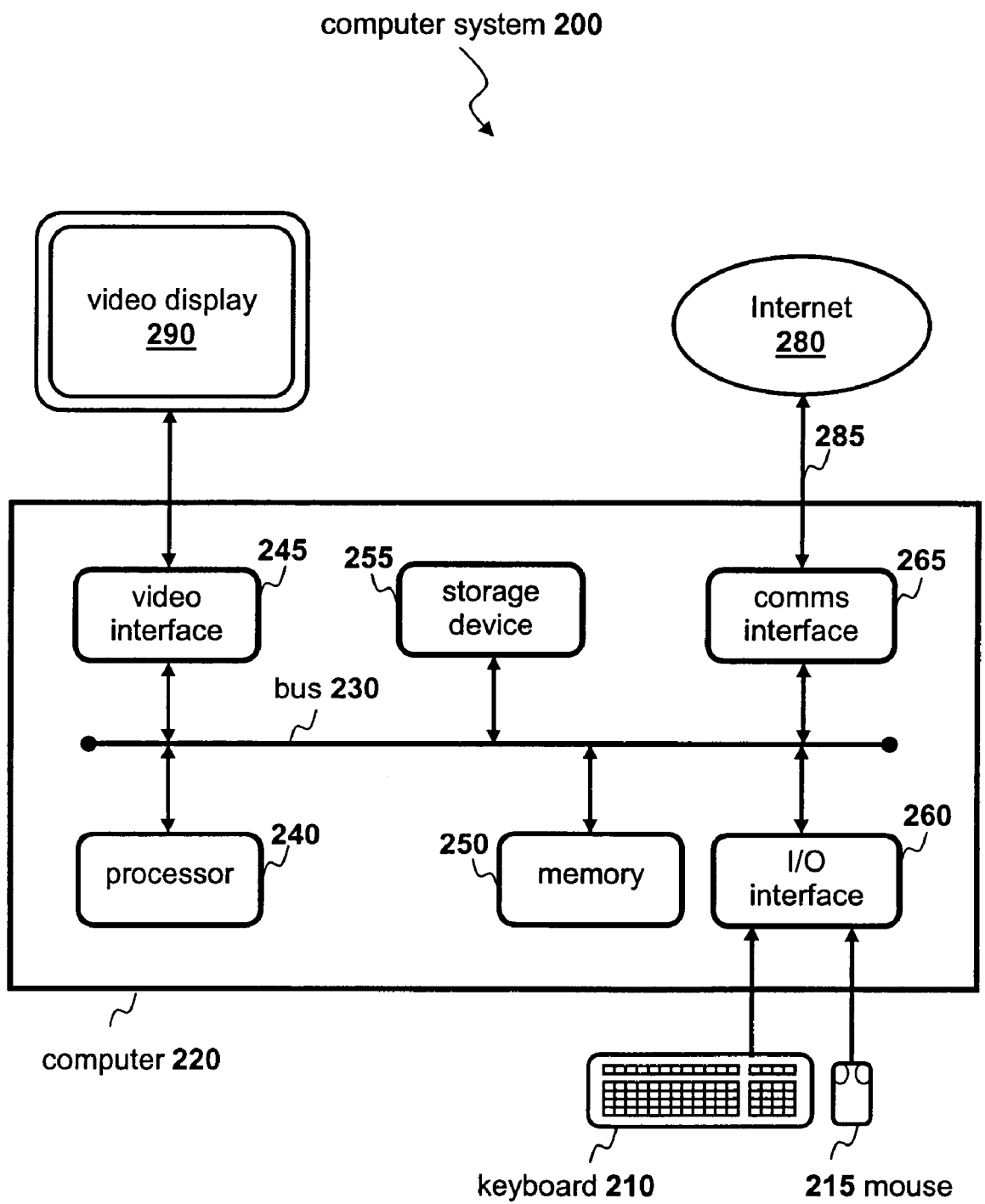
FIG. 5 is a schematic representation of a computer system suitable for performing the techniques described herein.

FIG. 5 is a schematic representation of a computer system 200 of a type suitable for executing computer software programs. Computer software programs execute under a suitable operating system installed on the computer system 200, and may be thought of as a collection of software instructions for implementing particular steps.

The computer system 200 serves as a node that hosts a composite service partition, as described above.

The components of the computer system 200 include a computer 220, a keyboard 210 and mouse 215, and a video display 290. The computer 220 includes a processor 240, a memory 250, input/output (I/O) interface 260, communications interface 265, a video interface 245, and a storage device 255. All of these components are operatively coupled by a system bus 230 to allow particular components of the computer 220 to communicate with each other via the system bus 230.

The processor 240 is a central processing unit (CPU) that executes the operating system and the computer software program executing under the operating system. The memory 650 includes random access memory (RAM) and read-only memory (ROM), and is used under direction of the processor 640.

The video interface 245 is connected to video display 290 and provides video signals for display on the video display 290. User input to operate the computer 220 is provided from the keyboard 210 and mouse 215. The storage device 255 can include a disk drive or any other suitable storage medium.

The computer system 200 can be connected to one or more other similar computers via a communications interface 265 using a communication channel 285 to a network, represented as the Internet 280.

The computer software program may be recorded on a storage medium, such as the storage device 255. Alternatively, the computer software can be accessed directly from the Internet 280 by the computer 220. In either case, a user can interact with the computer system 200 using the keyboard 210 and mouse 215 to operate the computer software program executing on the computer 220. During operation, the software instructions of the computer software program are loaded to the memory 250 for execution by the processor 240.

Other configurations or types of computer systems can be equally well used to execute computer software that assists in implementing the techniques described herein.

CONCLUSION

The adaptive system and methods described herein improves the overall performance of the system, measured in terms of throughput and response time. Queuing is reduced, and system resources are released for other tasks, which improves scalability and results in consistent optimal performance. Consistent performance of the adaptive system assists service providers to commit to service level agreement (SLA) guarantees with clients.

Various alterations and modifications can be made to the techniques and arrangements described herein, as would be apparent to one skilled in the relevant art.

We claim:

1. A computer-implemented method for directing requests for a workflow based composite web service in response to variations in network and node level resources, the method comprising:

selecting one of a plurality of topologies at run time to which an incoming request is sent based on an availability of resources, wherein each of the topologies comprise a set of composite web service code partitions connected by communication links;

receiving monitored data values for at least one parameter associated with nodes that host the workflow based composite web service code partitions and the communications links that connect said nodes;

estimating performance metrics for respective topologies based upon said monitored data values, the monitored data values is received with greater frequency than the estimating of the performance metrics; and routing an incoming subsequent request for a workflow based composite web service to another one of the topologies based upon the estimated performance metrics for the respective topologies.

2. The method of claim 1, wherein the estimating of the performance metrics comprises calculating the performance metrics based upon a performance model.

3. The method of claim 2, wherein the performance model takes as input: average message sizes flowing between different composite web service code partitions, a rate of incoming and outgoing messages at each composite web service code partition, and an available bandwidth on each communications link.

4. The method of claim 1, wherein the monitored parameters associated with a communications link are chosen from among one or more of: available bandwidth, average message size, and average message rate.

5. The method of claim 1, wherein the monitored parameters associated with a node are chosen from among one or both of: available CPU cycles, and available memory.

6. The method of claim 1, wherein the routing of the requests includes balancing incoming requests for the workflow based composite web service amongst the plurality of topologies.

7. The method of claim 1, wherein the routing of the requests includes switching incoming subsequent requests for a workflow based composite web service amongst the plurality of topologies.

8. The method of claim 1, wherein the performance metric estimated for the topologies is representative of the projected throughput of the topologies.

9. The method of claim 1, further comprising:
generating at least one predetermined topology based upon a workflow specification for the workflow based composite web service using a flow decentralization algorithm, wherein each topology has one partition for each component service of the workflow based composite web service.

10. A computer program product comprising a storage medium readable by a computer system and recording software instructions, which when executed by a computer system implement a method for directing requests for a workflow based composite web service in response to variations in network and node level resources comprising:
selecting one of a plurality of topologies at run time to which an incoming request is sent based on an availability of resources, wherein each of the topologies comprise a set of composite web service code partitions connected by communication links;
receiving monitored data values for at least one parameter associated with nodes that host the workflow based composite web service code partitions and the communications links that connect said nodes;
estimating performance metrics for respective topologies based upon said monitored data values, the monitored data values is received with greater frequency than the estimating of the performance metrics; and
routing a subsequent request for a workflow based composite web service to another one of the topologies based upon the estimated performance metrics for the respective topologies.

11. A computer system comprising: a processor to execute software instructions; a memory to store said software instructions; a system bus coupling the memory and the processor; and a storage medium to record said software instructions that are loaded into the memory for implementing a method for directing requests for a workflow based composite web service in response to variations in network and node level resources comprising:
selecting one of a plurality of topologies at run time to which an incoming request is sent based on an availability of resources, wherein each of the topologies comprise a set of composite web service code partitions connected by communication links;
receiving monitored data values for at least one parameter associated with nodes that host the workflow based composite web service code partitions and the communications links that connect said nodes;
estimating performance metrics for respective topologies based upon said monitored data values, the monitored data values is received with greater frequency than the estimating of the performance metrics; and
routing a subsequent request for a workflow based composite web service to another one of the topologies based upon the estimated performance metrics for the respective topologies.

12. A system for executing requests for a workflow based composite web service delivered using workflow based composite web service code partitions that are connected by communications links to form a topology, amongst predetermined topologies of the partitions, the system comprising:
a client-facing computer system receiving requests for a workflow based composite web service, and
a plurality of computer systems connected to the client-facing computer system by said communications links;
wherein the plurality of computer systems each host partitions of the workflow based composite web service according to the predetermined topologies and monitor modules to transmit to the client-facing computer system monitored data relating to at least one of the communications links and the computer systems upon which the partitions are hosted; and
wherein the client-facing computer system hosts a decision maker module that estimates performance metrics for respective topologies based upon the monitored data, said client-facing computer receives the monitored data values with greater frequency than the decision maker module estimates the performance metrics, and a switch module that routes each of the requests for the workflow based composite web service to one of the topologies based upon the estimated performance metrics for the respective application topologies.

13. The system of claim 12, wherein said decision maker module calculates the performance metrics based upon a performance model.

14. The system of claim 13, wherein the performance model takes as input: average message sizes flowing between said connected computer systems, a rate of incoming and outgoing messages at each said connected computer system, and an available bandwidth on each communications link.

15. The system of claim 12, wherein the monitored parameters associated with a communications link are chosen from among one or more of: available bandwidth, average message size, and average message rate.

16. The system of claim 12, wherein the monitored parameters associated with a connected computer system are chosen from among one or both of: available CPU cycles, and available memory.

17. The system of claim 12, wherein said decision maker module routes the requests by balancing incoming requests for the workflow based composite web service amongst the predetermined topologies.

18. The system of claim 12, wherein said decision maker module routes the requests by switching incoming requests for the workflow based composite web service amongst the predetermined topologies.

19. The system of claim 12, wherein the performance metric estimated for the topologies is representative of the projected throughput of the topologies.

* * * * *

UNITED STATES PATENT AND TRADEMARK OFFICE
CERTIFICATE OF CORRECTION

PATENT NO.       : 7,584,276 B2
APPLICATION NO.  : 11/236273
DATED            : September 1, 2009
INVENTOR(S)      : Chafle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1009 days.

Signed and Sealed this

Fourteenth Day of September, 2010

David J. Kappos
*Director of the United States Patent and Trademark Office*